No. 676,600. Patented June 18, 1901.
J. R. BROWN.
VEHICLE BRAKE.
(Application filed Dec. 6, 1900.)
(No Model.) 2 Sheets—Sheet 1.

Witnesses
J. R. Brown, Inventor.
Attorneys

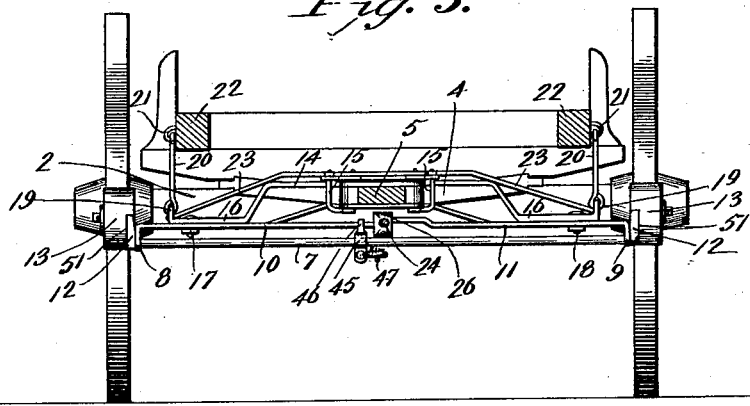
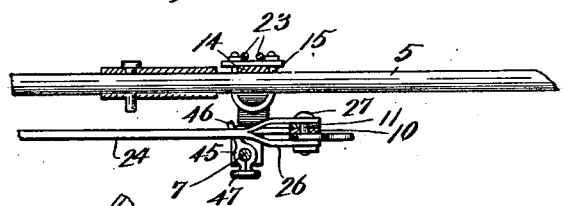
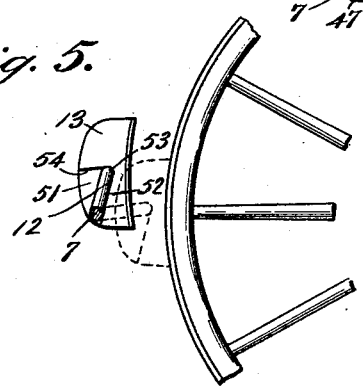
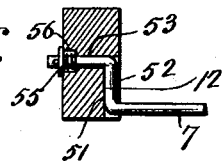

UNITED STATES PATENT OFFICE.

JOHN R. BROWN, OF EAU CLAIRE, WISCONSIN.

VEHICLE-BRAKE.

SPECIFICATION forming part of Letters Patent No. 676,600, dated June 18, 1901.

Application filed December 6, 1900. Serial No. 38,923. (No model.)

*To all whom it may concern:*

Be it known that I, JOHN R. BROWN, a citizen of the United States, residing at Eau Claire, in the county of Eau Claire and State of Wisconsin, have invented a new and useful Automatic Vehicle-Brake, of which the following is a specification.

This invention relates to vehicle-brakes, and has for one object to provide for automatically applying the brake-shoes when the vehicle thrusts forward, as when descending a hill, and to provide for automatically releasing the brake when the vehicle is being backed. It is furthermore designed to provide for a quick and powerful application of the brake-shoes to the wheels, and, finally, to arrange for supporting the device in a strong and convenient manner upon the running-gear, so that it may be applied to any ordinary vehicle without altering the latter.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
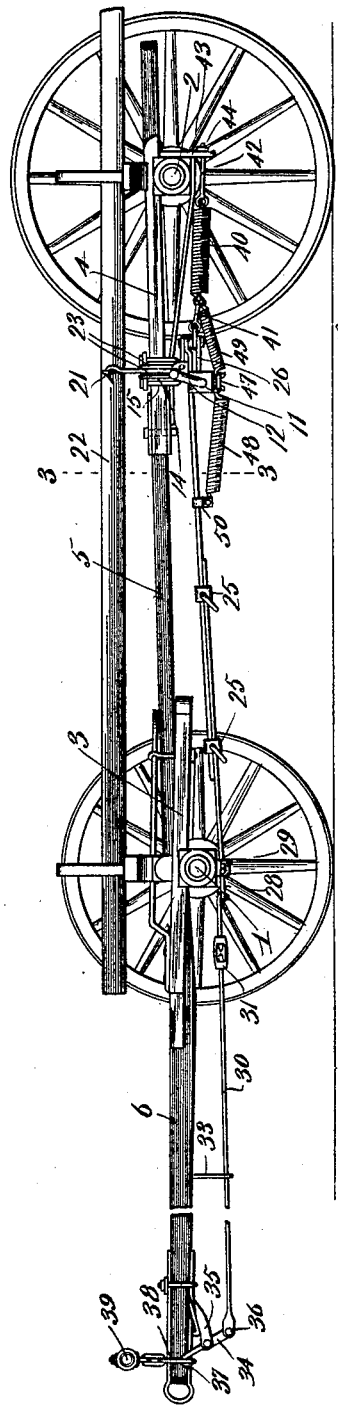
Figure 2:
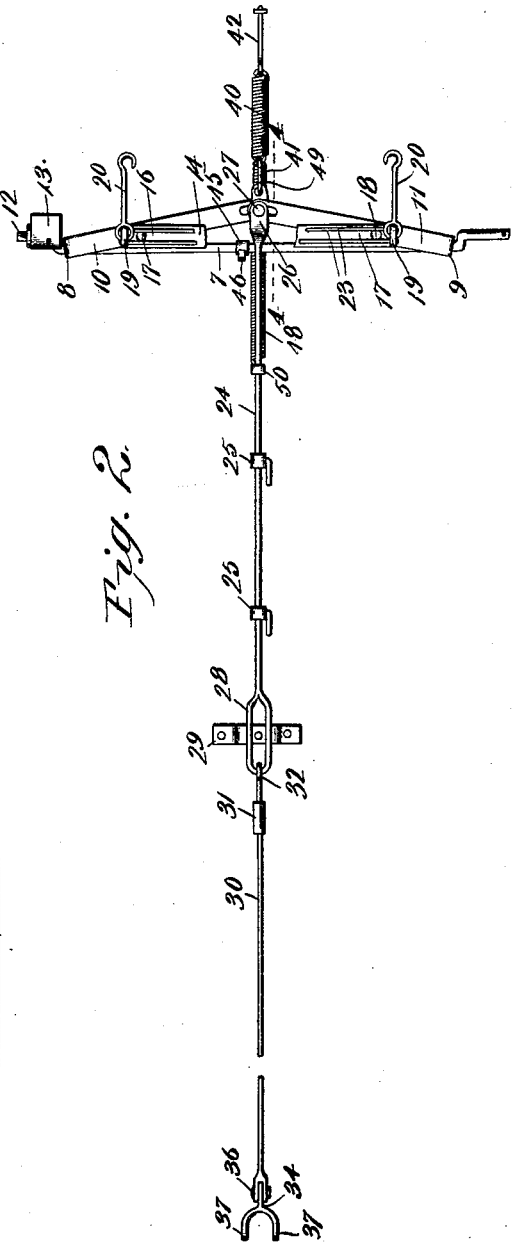

In the drawings, Figure 1 is a side elevation of a vehicle having the improved brake applied thereto, the adjacent wheels being removed to expose the brake mechanism. Fig. 2 is a top plan view of the brake mechanism. Fig. 3 is a transverse sectional view taken on the line 3 3 of Fig. 1. Fig. 4 is a detail sectional view taken on the line 4 4 of Fig. 2. Fig. 5 is a detail view illustrating the mounting of one of the brake-shoes. Fig. 6 is a transverse sectional view taken through one of the brake-shoes.

Like characters of reference designate corresponding parts in all of the figures of the drawings.

To adequately illustrate the application and operation of the present form of brake, there has been illustrated in Figs. 1 and 3 of the drawings the running-gear of an ordinary vehicle having the front and rear wheeled axles 1 and 2, respectively, the front and rear hounds 3 and 4, which are connected by the reach 5, and the forwardly-projecting tongue or pole 6. It will be understood that these parts are common and well known, and therefore may have any preferred form.

In carrying out the invention I employ a transverse brake-beam 7, as best shown in Fig. 3 of the drawings, and in the form of a rock-shaft, which is also movable laterally in a direction front and rear of the vehicle. This shaft lies beneath the running-gear at the front of the rear wheels and has its opposite end portions journaled upon the downturned outer terminals 8 and 9 of the respective brake-levers 10 and 11. Each end of the rocking brake-beam is provided with a normally-upstanding crank-arm 12, which carries a brake-shoe 13 for engagement with the front of the periphery of the adjacent rear wheel of the vehicle.

For the support of the levers there is employed a transverse yoke-shaped bar 14, which has its intermediate portion resting transversely across the tops of the rear hounds, to the members of which it is connected by means of the fastening-clips 15, that embrace the bar and the respective members of the hounds. The opposite end portions of this yoke or bar are bent downwardly and then extended laterally outward, as at 16, to the under sides of which parts the levers are intermediately fulcrumed, as at 17 and 18, respectively. Each terminal of the supporting-bar is provided with a perforate upturned ear 19, having a swinging hook 20 loosely engaged with the perforation in the ear and detachably engaged with an eye 21, projecting outwardly from the outer side of the adjacent longitudinal sill 22 of the vehicle-frame, which is located above the supporting-bar, whereby the outer ends of the latter are conveniently and effectively braced. The outer ends of the supporting-bridge formed by the bar 14 are furthermore braced by means of a pair of truss-rods 23, (shown in Figs. 2 and 3,) the ends of the rods being connected to the respective ears 19 and having their intermediate portions passed over the bridge and the rear hounds. By this arrangement the intermediate portion of the lever-supporting bridge is supported by the hounds and the outer ends thereof are suspended from the frame of the vehicle.

To swing the brake-levers upon their fulcrums, there is provided a brake-rod 23, which lies longitudinally beneath the reach 5 of the running-gear and is formed in opposite longitudinal sections, having their inner ends overlapped and adjustably connected by means of the clamps or fastenings 25, whereby the rod may be lengthened and shortened to accommodate the same to the length of the vehicle. The rear end of the rod is provided with a fork 26, which lies transversely between the brake-beam and the hounds. Within this fork are received the inner overlapped ends of the brake-levers, which have a mutual pivot-pin 27, that connects them to the fork.

The forward end of the brake-rod lies beneath the front axle and is formed into a terminal link 28, which is slidably suspended by means of a stirrup-strap 29, secured to the under side of the axle. A connecting-rod 30, which is formed in opposite sections, adjustably connected by means of a turnbuckle 31, has its rear end provided with a hook 32, that is loosely and detachably engaged with the link 28, thereby forming a pivotal or hinged connection with the brake-rod to permit of the lateral movement of the tongue or pole 6, to which the rod is suspended by means of a guide link or eye 33.

For the automatic operation of the brake-rod there is provided an upright trip-lever 34, which is located below the outer end of the draft tongue or pole and is fulcrumed intermediate of its ends upon a suitable hanger 35, pendent from the pole. The lower end of the trip-lever is pivotally connected to the forward end of the rod 30, as indicated at 36, and its upper end is forked, so as to embrace the tongue, the members of the forked portion being formed into hooks 37, which loosely engage the neck-yoke ring 38, which is slidable upon the pole and is suspended from the neck-yoke 39.

In the operation of the brake mechanism—as, for instance, when the vehicle is descending a hill—the pole will be thrust forward through the neck-yoke ring, thereby drawing the upper end of the trip-lever rearwardly and the lower end forwardly, whereby the brake-rod is drawn longitudinally forward. As the brake-rod is connected to the inner ends of the intermediately-fulcrumed brake-levers, said inner ends will be drawn forwardly and the outer ends thrown rearwardly, thereby applying the brake-shoes to the rear wheels. Thus the operation of the brake mechanism is automatic and is caused by the forward thrust of the vehicle against the hold-back draft of the draft-animals.

The brake-shoes are normally held out of engagement with the wheels by means of a coiled spring 40, which is connected to the rear axle and also has a linked connection 41 with the pivot-pin 27, which connects the inner ends of the brake-levers to the brake-rod. It will be understood that the brake is applied against the tension of this spring, and the latter retracts and releases the brake when the draft-animals start ahead or relieve the back draft. It is preferable to provide the rear end of the spring with a rod 42, which has its outer screw-threaded end passed beneath the axle and engaged with a screw-threaded opening in a plate or strap 43, which is pendent from the rear side of the axle. A nut 44 is applied to the projecting end of the rod, whereby the tension of the spring may be conveniently adjusted.

The foregoing description relates to the bodily lateral movement of the brake-beam, and I will now describe the means for rocking the beam, so as to quickly and firmly engage the shoes with the wheels.

Upon the intermediate portion of the brake-beam there is provided a trip device in the form of a clip 45, having an upstanding trip shoulder or projection 46 extending above the beam and a laterally-disposed link or eye 47 lying beneath the beam, and with which are connected the adjacent ends of the front and rear coiled springs 48 and 49. The front spring extends forwardly beneath the brake-rod and is connected thereto by means of a clip 50, and the rear end of the other spring is connected to the link connection between the brake-lever spring and the brake-levers. When the brake-rod 24 is pulled forwardly, the front spring 48 will be expanded, thereby rocking the brake-beam so as to throw the normally-upright crank-arms of the beam rearwardly, whereby the brake-shoes are quickly brought into engagement with the wheels before they would be engaged by the throw of the levers, and the latter tend to crowd the shoes more firmly against the wheels. This operation will be best understood by reference to Fig. 5 of the drawings, wherein the full lines illustrate the normal position of the crank-arm and the adjacent shoe, the former being substantially upright. When rocked rearwardly, as indicated by the dotted lines, the crank-arm is swung downwardly, thereby quickly bringing the shoe against the wheel, and the movement of the latter and the brake-lever tends to wedge the shoe between the brake-beam and the wheel, thereby securing a very effective application of the brake. When the forward strain upon the brake-rod is relieved, the spring 49 will rock the brake-beam so as to throw the shoes out of engagement with the wheel before they would otherwise be disengaged by the movement of the levers, thereby securing a quick release of the brake.

As best shown in Figs. 3 and 5 of the drawings, the inner side of each brake-shoe is provided with an angular socket or recess 51, which is located in the lower half of the shoe and opens out through the front and bottom edges thereof. Normally the crank-arm 12 rests against the back 52 of the recess, and the spindle 53 at the upper end of the crank passes loosely through the center of the shoe and at the intersection of the back and the top 54 of the socket. In the applied position of the shoe the top wall of the socket rests upon the crank-arm, whereby the shoe is braced in both positions. A coiled friction-spring 55 encircles the outer end of the spindle and is snugly received within a socket 56 in the outer side of the brake-shoe, whereby the latter is held steady and is prevented from rattling.

It will of course be understood that in backing the vehicle the brake will be applied; but in view of the upward movement of the adjacent portions of the wheels the rocking brake-beam will be rocked away from the wheels by the upward movement of their peripheries, or, in other words, the wheels will slip across the brake-shoes with very little friction. This result is possible in view of the yieldable means for rocking the beam by the movement of the brake-rod. Moreover, just before the inner ends of the levers reach their forward limits one of said levers strikes the trip projection 46 on the brake-beam, thereby rocking the same so as to swing the crank-arms upwardly and away from the wheels, thereby releasing the brake, although the brake-levers may be at the limit of their applied positions.

From the foregoing description it will be apparent that the present brake mechanism may be conveniently applied to any ordinary vehicle without altering or changing the latter in any manner, and the brake is automatically operated through its connection with the neck-yoke. Moreover, the brake-beam has a rocking movement as well as a slidable movement, whereby the brake-shoes are quickly applied and also wedged against the wheels, and through the medium of such rocking movement the shoes may be quickly relieved from the wheels. Also through the yieldable means for rocking the brake-beam the brake-shoes are thrown out of engagement with the wheels during the backing of the vehicle, so as to prevent the application of the brake when the levers are in their applied positions.

What is claimed is—

1. In a vehicle-brake, a slidable and rocking brake-beam, a lever for sliding the beam, a brake-rod connected to the lever, and a beam-rocking spring having one end connected to the beam and its opposite end connected to the brake-rod.

2. In a vehicle-brake, the combination with a support, of opposite levers fulcrumed intermediate of their ends upon the support, a brake-rod connected to the inner ends of the levers, a slidable brake-beam journaled in the outer ends of the levers, and provided with opposite crank-arms, brake-shoes upon the crank-arms, and a spring connected to one side of the journaled brake-beam and also to the brake-rod.

3. In a vehicle-brake, the combination with an intermediately-pivoted support, of a swinging brake-shoe mounted upon one end of the support solely, an operating device connected to the opposite end of the support, and means extending between the shoe and the operating device for swinging the former by a movement of the latter.

4. In a vehicle-brake, the combination with an intermediately-pivoted support, of a rocking brake-beam journaled upon one end portion of the support only, a brake-shoe carried by one end of the beam, an operating device connected to the opposite end of the support, and a beam-rocking connection between the operating device and one side of the beam.

5. A vehicle-brake, having means for automatically tripping the same out of its applied position by a continuous movement of the operating device and after a predetermined point of said movement.

6. A vehicle-brake, having a rocking brake-beam, provided with a crank-arm, a brake-shoe carried by the crank-arm, an operating device for the brake-beam, and means for reversely rocking the beam to release the brake-shoe after a predetermined point in the application thereof and by the continued operation of the operating device.

7. In a vehicle-brake, a slidable and rocking brake-beam, means for sliding the beam, and a rocking trip device carried by the beam and located in the path of the said means.

8. In a vehicle-brake, a slidable and rocking brake-beam, means for sliding the beam, a yieldable rocking device therefor, and a rocking trip device carried by the beam and located in the path of the means for sliding the beam.

9. In a vehicle-brake, the combination with a support, of a rocking and slidable brake-beam, a lever fulcrumed upon the support and connected to the beam, a brake-rod connected to the lever, a yieldable rocking device for the beam, and a rocking trip device carried by the beam and in the path of the lever.

10. In a vehicle-brake, the combination with a support, of a rocking and slidable brake-beam, a lever fulcrumed upon the support and connected to the beam, a brake-rod connected to the lever, a spring connected to one side of the beam and also to the brake-rod, and a trip projection carried by the beam and located in the path of the lever.

11. In a vehicle-brake, the combination with a support, of a rocking and slidable brake-beam, having opposite terminal crank-arms, brake-shoes mounted upon the arms, opposite brake-levers fulcrumed intermediate of their ends upon the support, the brake-beam being journaled in the outer ends of the levers, operating means connected to the inner ends of the levers, a coiled spring having its opposite ends connected to one side of the beam and the operating means respectively, and a trip projection carried by the beam and located in the path of the forward movement of the inner portion of one of the levers.

12. A vehicle-brake, having a brake-shoe, which has a slidable applying movement, and an elastically-yieldable swinging applying movement.

13. A vehicle-brake, having a brake-shoe, which has simultaneous slidable and swinging applying movements, and the swinging movement being elastically yieldable.

14. In a vehicle-brake, the combination with a bridge-bar, of opposite brake-levers fulcrumed intermediate of their ends upon the bar, operating means connected to the inner ends of the levers, and a brake-beam carried solely by and suspended from the outer ends of the levers.

15. The combination with a vehicle, having a bed thereon, of a bridge-bar extending transversely across the running-gear of the vehicle, terminal brace connections between the ends of the bar and the bed, opposite brake-levers fulcrumed intermediate of their ends upon the bridge-bar, operating means connected to the inner ends of the levers, and a brake-beam carried solely by and suspended from the outer ends of the levers.

16. The combination with a wheeled vehicle, having a bed thereon, of a bridge extending across the running-gear thereof, and having upstanding terminal ears, upstanding hooks loosely connected to the respective ears, lateral projections carried by the bed and for detachable engagement with the respective hooks, opposite levers fulcrumed intermediate of their ends upon the under side of the bridge, an operating device connected to the inner ends of the levers, a brake-beam carried solely by and suspended from the outer ends of the levers, and one or more truss-rods connected to the opposite upstanding ears of the bridge.

17. The combination with the running-gear of a vehicle, of a bridge extending transversely across the running-gear, and having its opposite ends inclined downwardly below the running-gear, and provided with upstanding terminal ears, one or more truss-rods extending across the intermediate portion of the bridge and having their opposite ends connected to the terminal ears, opposite brake-levers fulcrumed intermediate of their ends upon the under side of the opposite end portions of the bridge, operating means connected to the inner ends of the levers, and a brake-beam carried solely by and suspended from the outer ends of the levers.

18. The combination with a wheeled vehicle, of a bridge extending transversely across the running-gear thereof, opposite brake-levers fulcrumed intermediate of their ends upon the bridge, an operating device pivotally connected to the inner ends of the levers, a brake-beam journaled in the outer ends of the levers, and having terminal cranks, brake-shoes upon the respective cranks, a spring having its opposite ends connected to the levers and the adjacent axle, respectively, a clip applied to an intermediate portion of the rocking beam, and having a trip projection located in the path of the forward swing of the inner end of one of the levers, and opposite springs having their inner ends connected to the other side of the clip, the rear spring also being connected to the brake-spring, and the front spring connected to the operating means.

19. A vehicle-brake, having a brake-shoe, which has a laterally-slidable applying movement, and a swinging applying movement, and operating means common to both movements of the shoe, and constructed to apply an elastically-yieldable swinging movement to the shoe.

20. The combination with a vehicle, having a draft pole or tongue, of a brake therefor, and means for automatically operating the same, comprising an upright trip-lever, a hanger pendent from the tongue, the lever being fulcrumed intermediate of its ends upon the hanger, a connection between the lower end of the lever and the brake, the upper end of the lever being forked and embracing the pole, the terminals of the fork members being hooked, and a neck-yoke ring slidably mounted upon the pole and loosely engaging the hooks of the trip-lever.

21. In a vehicle-brake, the combination with an intermediately-pivoted support, of a swinging or rocking brake-beam journaled upon one end portion solely of the support, an operating device connected to the opposite end of the support, a crank-arm upon the beam, a brake-shoe carried by the arm, and a spring having one end connected to the operating device and its opposite end connected to one side of the rocking beam.

22. A vehicle-brake, having a rocking brake-beam, a beam-rocking operating device, and a beam-reversing trip carried by the beam and located in the path of a portion of the operating device and adjacent to the forward limit thereof.

23. In a vehicle-brake, the combination with an intermediately-fulcrumed support, of a rocking brake-beam journaled upon one end portion of the support only, an operating device connected to the opposite end of the support, a crank-arm upon the beam, a brake-shoe carried by the arm, a spring having its opposite ends connected to one side of the beam and the operating device, respectively, and a trip projected laterally from the beam and located in the path of the forward movement of that end of the support which is connected to the operating device.

In testimony that I claim the foregoing as my own I have hereto affixed my signature in the presence of two witnesses.

JOHN R. BROWN.

Witnesses:
HENRY McBAIN,
T. H. BROWN.